United States Patent Office 3,591,552
Patented July 6, 1971

3,591,552
STABILIZED VINYL HALIDE RESIN COMPOSITIONS
Samuel Hoch, Brooklyn, N.Y., assignor to Tenneco Chemicals, Inc.
No Drawing. Continuation-in-part of application Ser. No. 677,861, Oct. 25, 1967. This application Dec. 15, 1969, Ser. No. 885,292
Int. Cl. C08g 45/62
U.S. Cl. 260—45.75
4 Claims

ABSTRACT OF THE DISCLOSURE

Vinyl halide resin compositions contain as stabilizer basic organotin compounds that have the structure

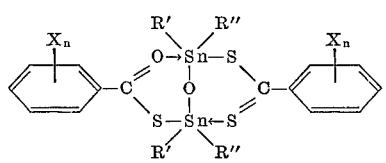

wherein each X represents a lower alkyl group; each $n$ represents an integer in the range of zero to two; and each R' and R" represents an alkyl group having 4 to 8 carbon atoms, an alkaryl group, an aralkyl group, a cycloalkyl group, or an aryl group.

---

This is a division of my copending patent application Ser. No. 677,861, which was filed on Oct. 25, 1967, now Pat. No. 3,505,370.

This invention relates to vinyl halide resin compositions. More particularly, it relates to vinyl halide resin compositions stabilized with certain basic organotin compounds.

A number of organotin compounds are known to be good heat stabilizers for vinyl halide resin compositions. None of these compounds is entirely satisfactory for this use because some of them are not stable and start to decompose to form inactive crystalline products on standing for as little as one day at room temperature; others are not readily soluble or are insoluble in the commonly-used organic solvents; and still others are characterized by undesirable odors.

In accordance with the present invention, it has been found that certain basic organotin compounds are excellent heat and light stabilizers for vinyl halide resin compositions. They are stable on prolonged storage, are readily soluble in hydrocarbons and other solvents, and do not have unpleasant odors.

The basic organotin compounds of this invention are chelate complexes that have the structure

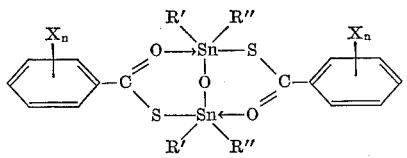

wherein each X represents an alkyl group having 1 to 4 carbon atoms; each $n$ represents an integer in the range of zero to two; and each R' and R" represents an alkyl group having 4 to 8 carbon atoms, an alkaryl group, an aralkyl group, a cycloalkyl group, or an aryl group. Illustrative of these chelate complexes is basic dibutyltin bis(thiobenzoate), which has the structure

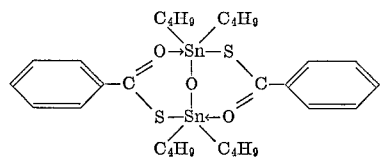

The basic organotin compounds of this invention may be prepared by the reaction of thiobenzoic acid or a lower alkyl-substituted thiobenzoic acid, such as thiotoluic acid, thio-dimethylbenzoic acid, or thio-tert.butylbenzoic acid, with a stoichiometric excess of an organotin oxide.

The organotin oxides that may be used are those having the structure R'R"SnO, wherein R' and R" have the aforementioned significance. The preferred organotin oxides for use in the preparation of the basic organotin compounds include dibutyltin oxide, dihexyltin oxide, dioctyltin oxide, ditolyltin oxide, dibenzyltin oxide, dicyclohexyltin oxide, diphenyltin oxide, butylphenyltin oxide, butyloctyltin oxide, butylbenzyltin oxide, and the like. Particularly satisfactory results have been obtained using dibutyltin oxide.

The reaction between the organotin oxide and the thiobenzoic acid to form the basic organotin compounds is usually carried out in an inert, non-polar solvent that will form an azeotrope with water. Suitable solvents include hydrocarbons and ketones, such as heptane, n-decane, isooctane, benzene, toluene, xylene, and acetone. The amount of solvent used is that which will provide a reaction mixture containing from about 20 percent to about 60 percent by weight of the solvent.

The basic organotin compounds of this invention may be prepared by heating the reaction mixture, which comprises the reactants and solvent, at its reflux temperature, which is usually between about 75° C. and 135° C., until substantially all of the water formed as a by-product of the reaction has been removed by azeotropic distillation. When the reaction has been completed, the reaction mixture is usually a clear solution of the basic organotin compound in the solvent. The solvent is then removed by distillation under atmospheric or subatmospheric pressure.

The amount of the organotin oxide that is used is about 105 percent to 400 percent of the amount required to form the corresponding neutral organotin compound. That is, a stoichiometric excess of about 5 percent to about 300 percent of the organotin oxide is used, with particularly satisfactory results being obtained when a stoichiometric excess of 10 percent to 100 percent is used. The product obtained is usually a mixture of neutral and basic organotin compounds, with the amount of the basic compound present largely dependent upon the amount of organotin oxide that is reacted.

The entire amount of organotin oxide may be present at the start of the reaction. Alternatively, equivalent amounts of the reactants may be present at the start of the reaction and additional amounts of the oxide added to the reaction mixture during the course of the reaction, or the oxide may be added to a solution of the neutral organotin compound to form the basic compound.

The vinyl halide resins that may be stabilized with the basic organotin compounds of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinyl bromide, as well as vinyl halide copolymers, including those formed by the polymerization of a vinyl halide with a comonomer such as vinyl acetate, vinyl butyrate, vinylidene chloride, styrene, methyl methacrylate, dialkyl fumarate or maleate, and the like. The copolymers useful in the practice of this invention are those that contain at least 70 percent of vinyl halide units and up to 30 percent of the comonomer units. The invention is also applicable to mixtures of vinyl halide resins in a major proportion with a minor proportion of another synthetic resin, such as chlorinated polyethylene, polyacrylate and polymethacrylate esters, and terpolymers of acrylonitrile, butadiene, and styrene. In addition to the vinyl halide resin and the stabilizer, the compositions may contain plasticizers such as dioctyl phthalate, dibutyl sebacate, tricresyl phosphate, and octyl diphenyl phosphate, lubricants, other heat and light stabilizers such as epoxidized oils and polyhydric alcohols, pigments, dyes, extenders, solvents, and other resin additives in the amounts ordinarily employed for the purpose indicated.

Only a small amount of the stabilizer need be present in the vinyl halide resin compositions of this invention. It has been found that as little as 1 percent of the stabilizer, based on the weight of the composition, will bring about an appreciable improvement in the heat and light stability of the composition. Ten percent or more of the stabilizer can be used, but these larger amounts generally do not provide further improvement in the properties of the resinous composition and for this reason are not ordinarily used. While the amount of the stabilizer that will provide optimum stability depends upon such factors as the choice of stabilizer and of vinyl halide resin, in most cases 1.5 percent to 6 percent of the stabilizer, based on the weight of the vinyl halide resin composition, is used.

The invention is further illustrated by the examples that follow. In these examples, all parts and percentages are parts by weight and percentages by weight.

EXAMPLE 1

A reaction mixture containing 54.4 parts (0.394 mole) of thiobenzoic acid, 58.8 parts (0.236 mole) of dibutyltin oxide, and 100 parts of benzene was heated at 85°–90° C. until 3 parts of water had been collected by azeotropic distillation and the reaction mixture had become clear. The amount of dibutyltin oxide used was 20 percent more than that required for the formation of the neutral compound.

The reaction mixture was heated to 80° C. under a vacuum of 30–40 mm. to remove the benzene and then filtered.

The basic dibutyltin-bis-(thiobenzoate) obtained was a clear reddish liquid that contained 25.6 percent Sn.

EXAMPLE 2

A reaction mixture containing 54.4 parts (0.394 mole) of thiobenzoic acid, 98 parts (0.394 mole) of dibutyltin oxide, and 100 parts of benzene was heated at 85°–90° C. until 3 parts of water had been collected by azeotropic distillation and the reaction mixture had become clear. The amount of dibutyltin oxide used was 100 percent more than that required for the formation of the neutral compound.

The reaction mixture was heated to 80° C. under a vacuum of 30–40 mm. to remove the benzene and then filtered.

The basic dibutyltin-bis-(thiobenzoate) obtained was a clear reddish liquid that contained 31.6 percent Sn.

EXAMPLE 3

A series of stabilized polyvinyl chloride resin compositions was prepared by the following procedure:

To a mixture of 100 parts of polyvinyl chloride (Tenneco 10 R), 15 parts of an acrylonitrile-butadiene-styrene terpolymer (Blendex 401), 4 parts of acrylic ester resin (K–120N), 1.35 parts of glyceryl monoricinoleate, 0.5 part of stearyl stearate, and 0.001 part of blue dye was added 2 parts of one of the stabilizers of this invention or the corresponding neutral organotin compound.

The mixtures were blended at room temperature and then charged to a two-roll, steam-heated mill whose roll surface was maintained at 340° F. The mixtures were milled for 5 minutes and then removed from the mill as flexible, homogeneous sheets 45 mils thick. The heat stability of the compositions was determined by placing 1 x 1 inch specimens that had been cut from the milled sheets in forced-circulation ovens at 350° F. and at 375° F. and removing specimens periodically until degradation was complete as indicated by color change.

In each case the specimens containing the basic dibutyltin-bis-(thiobenzoate) as stabilizer were substantially superior in early color hold (10 to 50 minutes at both temperatures) and heat stability to those containing the corresponding neutral compound.

The terms and expressions which have been employed are used as terms of description and not of limitation. There is no intention in the use of such terms and expressions of excluding any equivalents of the features shown and described or portions thereof; it is recognized, however, that various modifications are possible within the scope of the invention claimed.

What is claimed is:

1. A heat and light stable resinous composition comprising a vinyl halide resin and about 1 part to 10 parts by weight per 100 parts by weight of said vinyl halide resin of a basic organotin compound having the structure

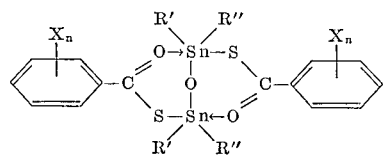

wherein each X represents an alkyl group having 1 to 4 carbon atoms; each $n$ represents an integer in the range of zero to two; and each R' and R'' represents an alkyl group having 4 to 8 carbon atoms, an alkaryl group, an aralkyl group, a cycloalkyl group, or an aryl group.

2. A heat and light stable resinous composition as set forth in claim 1 wherein the vinyl halide resin is polyvinyl chloride.

3. A heat and light stable resinous composition as set forth in claim 1 that contains 1.5 parts to 6 parts by weight of the basic organotin compound per 100 parts by weight of polyvinyl chloride.

4. A heat and light stable resinous composition as set forth in claim 1 wherein the basic organotin compound is basic dibutyltin bis-(thiobenzoate).

References Cited

UNITED STATES PATENTS 2,626,953 5/1948 Mack _____ 260—45.75
2,914,506 1/1953 Mack _____ 260—45.75

DONALD E. CZAJA, Primary Examiner

V. P. HOKE, Assistant Examiner

U.S. Cl. X.R.

260—23, 891